(12) United States Patent
Yu

(10) Patent No.: US 8,131,156 B2
(45) Date of Patent: Mar. 6, 2012

(54) CENTRALIZED LIGHTWAVE WDM-PON EMPLOYING INTENSITY MODULATED DOWNSTREAM AND UPSTREAM

(75) Inventor: Jianjun Yu, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 771 days.

(21) Appl. No.: 12/235,013

(22) Filed: Sep. 22, 2008

(65) Prior Publication Data

US 2009/0274462 A1 Nov. 5, 2009

Related U.S. Application Data

(60) Provisional application No. 61/049,531, filed on May 1, 2008.

(51) Int. Cl.
 *H04B 10/00* (2006.01)
(52) U.S. Cl. .................................. 398/168; 398/169

(58) Field of Classification Search .............. 398/168, 398/169
See application file for complete search history.

(56) References Cited

U.S. PATENT DOCUMENTS

| | | | | |
|---|---|---|---|---|
| 2004/0213574 A1* | 10/2004 | Han et al. | | 398/71 |
| 2006/0140631 A1* | 6/2006 | Brolin | | 398/79 |
| 2008/0159758 A1* | 7/2008 | Shpantzer et al. | | 398/214 |

* cited by examiner

*Primary Examiner* — Tod T Van Roy
(74) *Attorney, Agent, or Firm* — James Bitetto; Joseph Kolodka

(57) ABSTRACT

An optical system and method includes a source-free optical network unit coupled to an optical fiber for receiving a centralized lightwave carrier signal with downstream data over the optical fiber. The optical network unit includes a coupler configured to split the original carrier signal into a first path and a second path. The first path includes an optical filter configured to reduce fading effects of the carrier signal. The second path includes a modulator configured to remodulate the centralized lightwave carrier signal with upstream data to produce an upstream data signal for upstream transmission.

16 Claims, 3 Drawing Sheets

CENTRALIZED LIGHTWAVE WDM-PON EMPLOYING INTENSITY MODULATED DOWNSTREAM AND UPSTREAM

RELATED APPLICATION INFORMATION

This application claims priority to provisional application Ser. No. 61/049,531 filed on May 1, 2008, incorporated herein by reference.

BACKGROUND

1. Technical Field

The present invention relates to optical fiber communication and more particularly to systems and methods for downstream and upstream optical transmission with wavelength reuse using a centralized lightwave.

2. Description of the Related Art

Research and development has been focused on the next generation of passive optical network (PON) access networks, such as wavelength division multiplexing (WDM) passive optical networks (WDM-PONs) and time division multiplexing PONs (TDM-PONs). However, TDM-PON systems need complex scheduling algorithms and framing technology to support different applications. WDM-PON still lacks the flexibility to dynamically allocate the bandwidth among optical network units (ONUs).

Wavelength reuse is a cost-effective solution in WDM-PON systems, and several re-modulation schemes have been proposed. However, these modulation schemes have at least the following disadvantages: 1) color ONUs are needed, which means that ONUs have an inflexibly assigned wavelength; and 2) poor chromatic dispersion (CD) tolerance for high speed (e.g., 10 Gb/s) signal transmission.

Wavelength reuse in proposed WDM-PONs employs phase modulated signals. Here, downstream differential phase shift keyed (DPSK) signals are generated by a phase modulator (PM). After a transmission fiber, the downstream DPSK signal is launched into the ONU via an optical circulator (OC), and 10% of optical power is received by an optically pre-amplified receiver, which consists of an optical variable optical attenuator (VOA), erbium-doped fiber amplifier (EDFA), a delayed interferometer (DI) for DPSK demonstration and a PIN receiver. The remaining optical power is launched into another PM to rewrite the downstream signal for the upstream data. One electrical delay line and electrical buffers are needed to align between the downstream and the applied electrical signals to the PM. In this way, phase modulators and the DI are required in the system. However, this configuration greatly increases the cost and complexity of the system.

SUMMARY

Orthogonal frequency division multiplexing (OFDM) is an effective modulation format for use in fiber-optic transmission systems because of its high spectrum efficiency and the resistance to a variety dispersions including chromatic dispersion. OFDM-PON does not transparently support various services and enable dynamic bandwidth allocation among these services. For traditional coherent detection, OFDM is employed by combining a received signal sideband with the local oscillator (LO) at the receiver, where an optical phase lock loop and polarization scrambler are required.

To reduce the phase noise of the LO, low line-width lasers are preferred at both transmitter and receiver. Direct-detection optical OFDM, compared with the traditional coherent detection, can significantly simplify the system complexity and eliminate the phase noise and frequency offset so that conventional DFB lasers can be employed.

In accordance with the present principles, a WDM-PON architecture with a centralized lightwave and direct detection is provided. A downstream (DS) signal with, e.g., 10-Gb/s intensity modulated 16 QAM (quaternary amplitude modulated) OFDM and, e.g., 1.75-Gb/s on-off keying (OOK) signals for upstream (US) are illustratively presented in accordance with one embodiment.

An optical system and method includes a source-free optical network unit coupled to an optical fiber for receiving a centralized lightwave carrier signal with downstream data over the optical fiber. The optical network unit includes a coupler configured to split the original carrier signal into a first path and a second path. The first path includes an optical filter configured to reduce fading effects of the carrier signal. The second path includes a modulator configured to remodulate the centralized lightwave carrier signal with upstream data to produce an upstream data signal for upstream transmission.

A WDM-OFDM-PON with a centralized lightwave is provided. In the illustrative example, a downstream signal with 10 Gb/s intensity modulated 16-QAM OFDM and upstream with 1.75 Gb/s OOK signal has been demonstrated. Also fading effects from double sideband (DSB) signals were reduced leading to at least a 2.5-dB power increase in the example architecture.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present embodiments include a lightwave centralized wavelength-division multiplexing—orthogonal frequency division multiplexing—passive optical network (WDM-OFDM-PON) architecture. In one illustrative embodiment, this architecture may employ 16-QAM intensity-modulated orthogonal frequency division multiplexing (OFDM) signals at 10 Gb/s for downstream transmission. Other speeds and modulations are also contemplated. A wavelength-reuse scheme is advantageously employed to carry upstream data to reduce cost at an optical network unit (ONU). By using one intensity modulator (IM), the downstream signal is re-modulated. In one example, upstream on-off keying (OOK) data is re-modulated at, e.g., 1.75 Gb/s, based on its likely return to zero (RZ) shape waveform. Other speeds and modulations are also contemplated.

Fading effects caused by double sideband (DSB) downstream signals, which led to a 2.5-dB penalty, were reduced to nearly zero. The fading effects were removed when the DSB OFDM downstream signals were converted to the single sideband (SSB) after shape filtering. The power penalty became negligible for both SSB OFDM downstream and the remodulated OOK upstream signals after over 25 km standard single mode fiber transmission.

Embodiments described herein may be entirely hardware, entirely software or including both hardware and software elements. In a preferred embodiment, the present invention is implemented in hardware, but may include software elements. Software includes but is not limited to firmware, resident software, microcode, etc.

Figure 1:
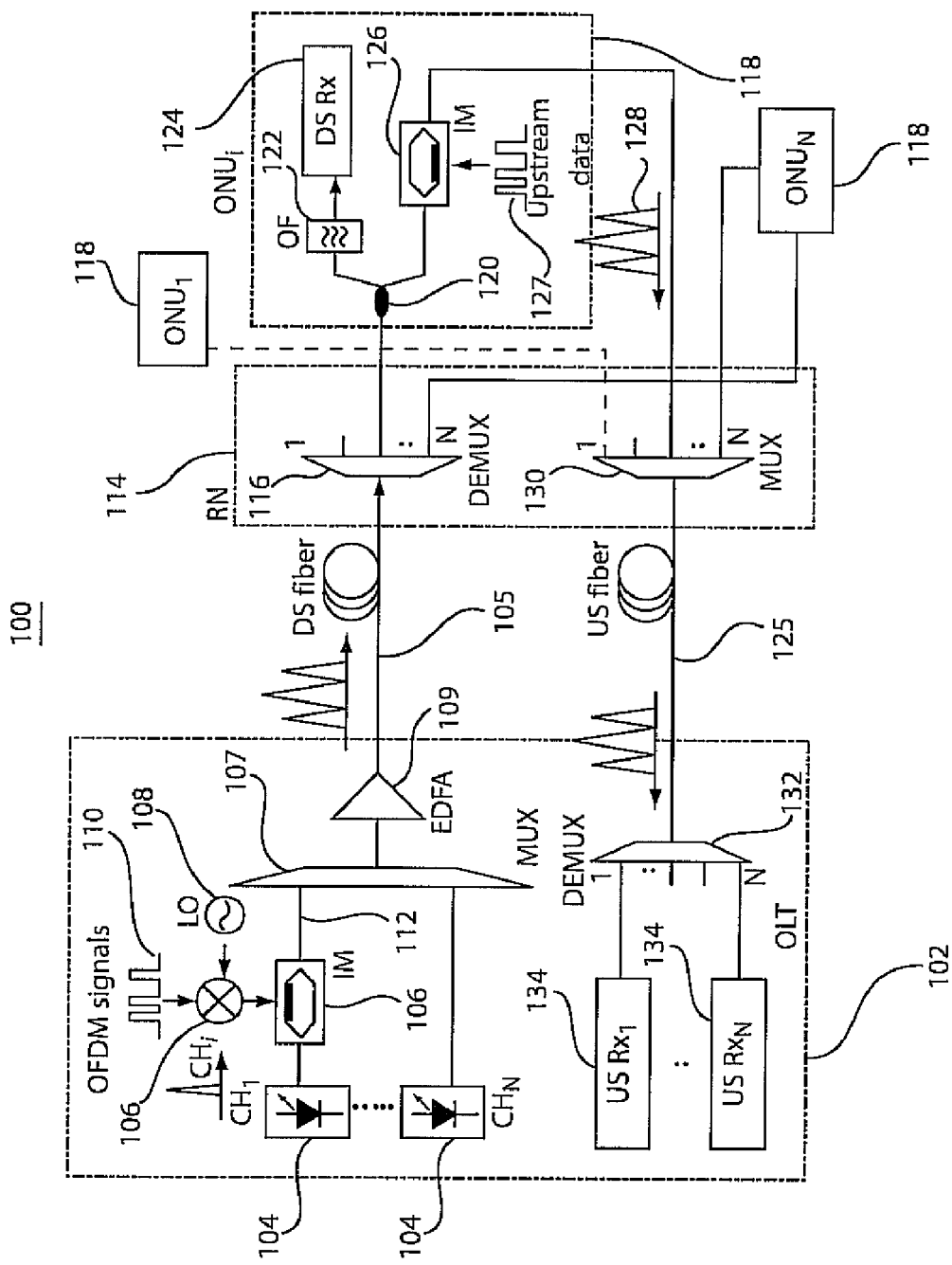
FIG. 1 is a block/flow diagram showing an illustrative optical network system in accordance with the present principles.

Referring now to the drawings in which like numerals represent the same or similar elements and initially to FIG. 1, an architecture 100 with a double sideband modulation scheme in a WDM-OFDM-PON is illustratively shown. An optical line terminal (OLT) 102 includes N distributed optical sources 104 for each of a plurality of channels ($CH_1$-$CH_N$). The optical sources 104 may include lasers, diodes or other suitable light sources with a predetermined wavelength associated with each channel $CH_i$. One intensity modulator (IM) 106 is employed to generate up-converted OFDM intensity modulated signals for WDM-OFDM downstream transmission.

Modulated OFDM data streams 112 are orthogonal to each other in the frequency domain, meaning that the cross-talk between the sub-channels is eliminated. OFDM baseband signals 110 are up-converted to a high radio frequency (RF) carrier by an electrical mixer 106 with a RF source (local oscillator 108). The power of RF OFDM signal is carefully adjusted to maintain a certain power ratio between LO 108 and first-order sidebands while suppressing second-order modes to increase dispersion tolerance and good receiver sensitivity. Since the optical carrier is usually 10 dB larger than the first order sidebands, the extinction ratio (ER) of the optical signal after the intensity modulator 106 is low. The channels (CH) are multiplexed onto a downstream fiber 105 using a multiplexer 107. An amplifier 109 (e.g., an Erbium doped fiber amplifier) may be employed to amplify the optical signals.

In a remote node (RN) 114, one demultiplexer (DEMUX) 116 is used to separate the channels (CH) and deliver the signals to each optical network unit (ONU) 118. The downstream signals are sent to two paths after passing through a coupler 120 (e.g., a 3 dB coupler). One part is fed to an OFDM receiver 124 after passing through one narrowband optical filter (OF) 122. This optical filter 122 is used to reduce the fading effects after the filter 122 converts double sideband signals to a single sideband. Without this filter 122, the power penalty will be large at a certain transmission distance due to fading effects. The optical filter 122 may include an optical interleaver (for multiple channels), a tunable optical filter (TOF) or a fiber Bragg grating (FBG).

For an upstream link 125, a downstream OFDM signal is re-modulated with upstream data 127 by another intensity modulator 126 based on its likely RZ shape on a waveform 128. Consequently, the centralized lightwave is realized because there is no additional light source in the ONU 118.

The remodulated light is multiplexed from a plurality of ONUs 118 using a multiplexer 130 (e.g., array waveguide grating (AWG)), which may be located at the remote node 114. The upstream link 125 is demultiplexed after being transmitted upstream on a fiber by a demultiplexer 132. The centralized lightwave is received by a plurality of upstream receivers 134.

Figure 2:
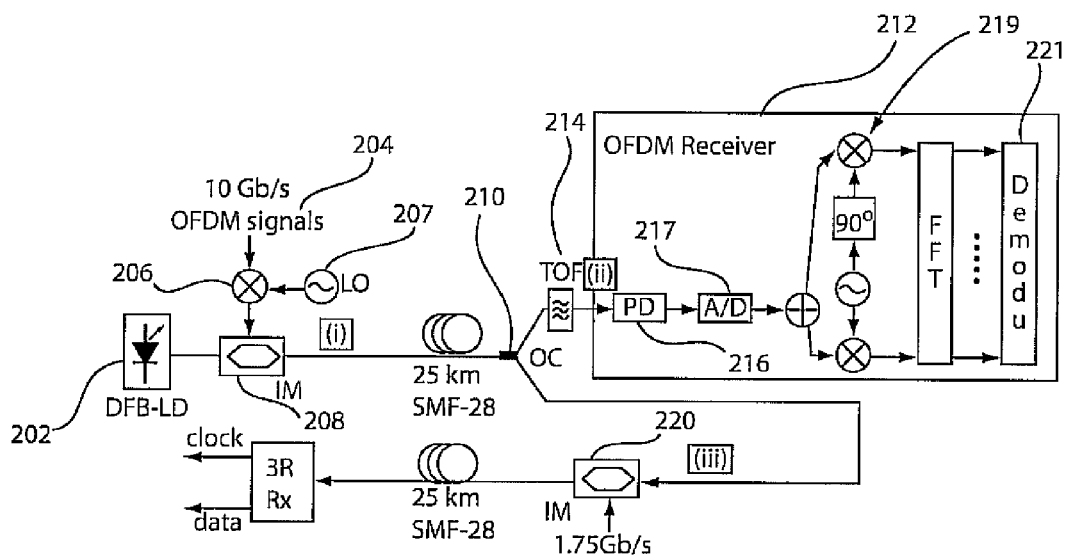
FIG. 2 is a block/flow diagram showing one embodiment of the optical network system of FIG. 1 employed in demonstrating the present principles.

Referring to FIG. 2, an illustrative embodiment of a WDM-OFDM-PON is illustratively depicted. In, e.g., a central office (CO) one constant wavelength (CW) lightwave is generated by a distributed feedback (DFB) laser 202 at, e.g., 1541.74 nm. An OFDM baseband signal 204 is generated offline and uploaded into an array waveguide grating (AWG) which continuously outputs at 10 Gsample/s and 10-bits digital to analog conversion (DAC) and the output bandwidth is 2.5 GHz based on Nyquist sampling. The 16-QAM OFDM signals at 10 Gb/s are mixed with a 14 GHz sinusoidal wave from a local oscillator (LO) 207 by a mixer 206. The mixed RF signal after amplification was driven by an intensity modulator 208. The optical spectrum with 0.01 nm resolution after the intensity modulator 208 is shown in FIG. 3A as inset (i).

After 25 km single mode fiber (SMF-28) transmission, the separated downstream traffic was divided into two parts by a 3 dB optical coupler 210. One part is delivered to a downstream OFDM receiver 212, and the other part is prepared for upstream signals. At the downstream receiver 212, the WDM-OFDM signal was filtered by a tunable optical filter (TOP) 214 with a bandwidth of 0.2 nm, the spectrum is shown in insert (ii) in FIG. 3B. FIG. 3B shows a single sideband since the double sideband (FIG. 3A) has been filtered.

The received RF OFDM signal was down-converted first and then sampled by a real-time oscilloscope at 10 Gsample/s after direct detection by a 45-GHz photo-detector (PD) 216. An analog to digital converter 217, down converting circuitry 219, Fast Fourier transforms (FFT) and demodulator 221 are provided in the receiver 212.

Figures 3A, 3B, 3C:
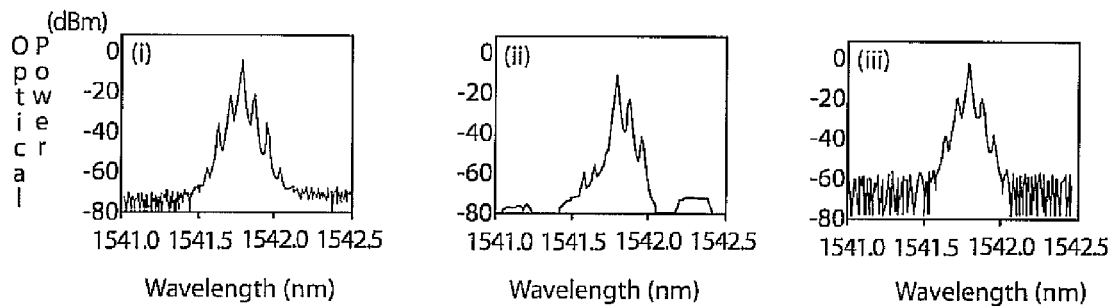
FIGS. 3A-3C show three graphs depicting optical power versus wavelength at three locations indicated in FIG. 2.

The waveform of the 16-QAM OFDM signal in FIG. 3C appears in the same RZ shape after over 25 km SMF-28 transmission as the modulated signal of FIG. 3A. Therefore, the signal can be re-modulated as the original signal was in the intensity modulated format. This provides the centralized lightwave signal. For the upstream link, the RF OFDM signal was re-modulated by an IM 220 at 1.75 Gb/s with Pseudo Random Binary Sequence (PRBS) of $2^{31}$-1. FIG. 3C inset (iii) shows the optical spectrum for upstream signals, before re-modulation. In the case without an optical interleaver (IL) or filter 214 at the receiver side, there is an obvious power penalty of about 2.5 dB. One interleaver (IL) is employed to filter out one sideband in order to study the fading effects (compare FIGS. 3A and 3B). After employing a 25/50 GHz spaced IL, there is no obvious power penalty after transmission. Therefore, the fading effects due to DSB signals led to a 2.5-dB power penalty. The bit error rate (BER) of back-to-back without IL has higher power sensitivity which resulted from more information being received at the receiver from triple peaks (e.g., baseband and two first-order sidebands).

Measured BER curves show that the 1.75 Gb/s upstream signal is carried with a clock of 14 GHz. The high-frequency components can be removed at the receiver with a 2 Ghz low-pass filter. The power penalty is less than 0.2 dB after transmission over 25 km SMP-28 at a BER equal to $10^{-9}$.

A novel WDM-OFDM-PON transmission system includes a centralized lightwave with direct detection. Using this scheme in one example, downstream 16-QAM intensity modulated OFDM at 10 Gb/s has been transmitted over a 25 km SMF-28 fiber. The fading effects from double sideband signals normally would lead to a 2.5-dB power penalty in this architecture. However, this is avoided by using an edge-sharp filter such as an optical interleaver to generate single sideband signals and obtain a negligible sensitivity penalty after transmission. For an upstream link, downstream OFDM signals were-re-modulated by an IM at 1.75 Gb/s. The fading effects were reduced or removed when the double sideband OFDM downstream signals are converted to single sideband after sharp filtering. The power penalty is negligible for both single sideband OFDM downstream, and the re-modulated OOK upstream signals after transmission over 25 km of standard single mode fiber.

Because OFDM is an effective modulation format for the next generation of optical networks, the present scheme can provide significant improvement on both system reliability and flexibility. By employing the present principles, WDM-OFDM-PON can be realized by using intensity modulators and a centralized light source to reduce the cost in ONUs. Additionally, OFDM has high flexibility and can be realized with dynamical bandwidth allocation among customer units.

Figure 4:
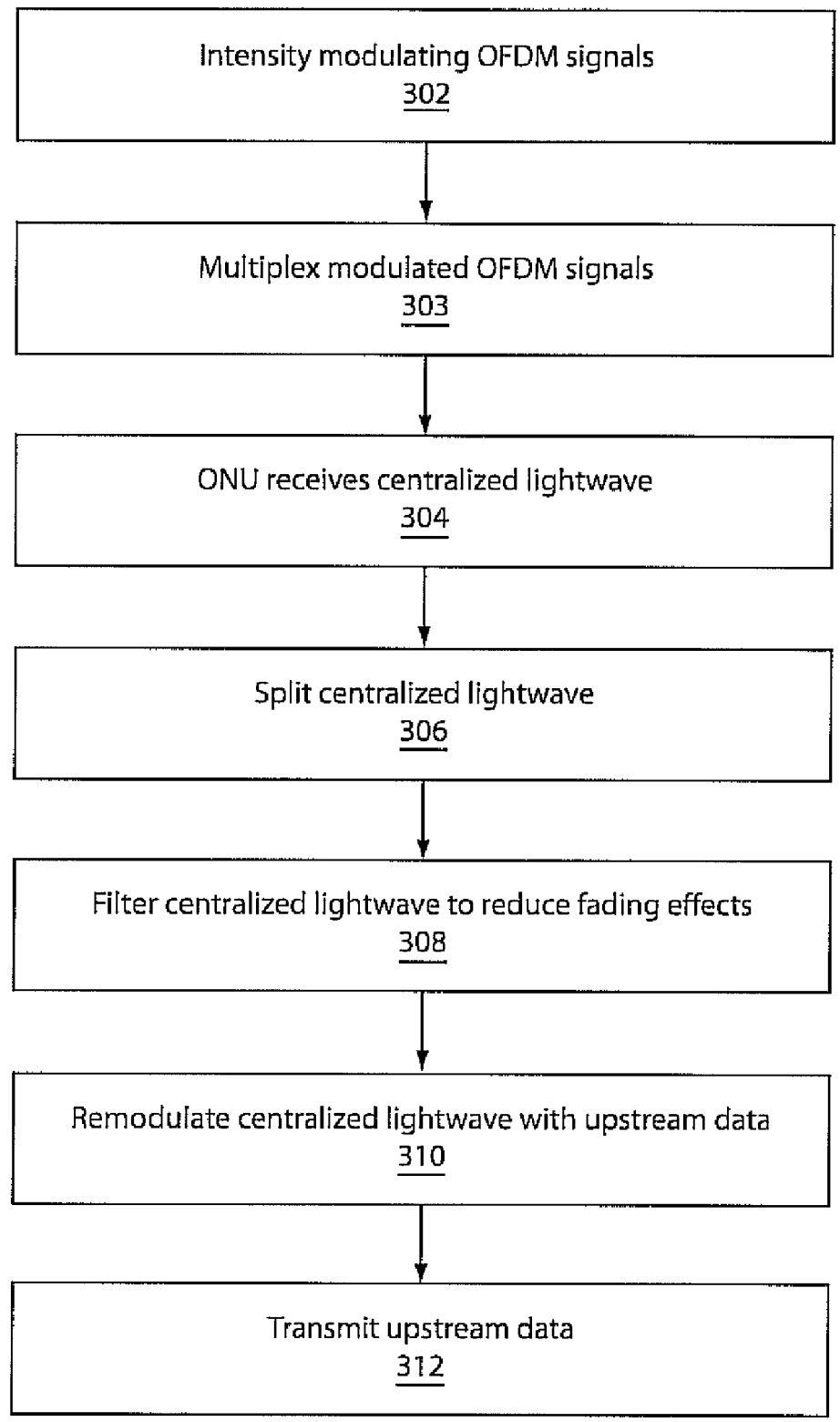
FIG. 4 is a block/flow diagram for a method for providing a centralized lightwave source in accordance with the present principles.

Referring to FIG. 4, a method for providing a centralized lightwave source includes intensity modulating orthogonal frequency division multiplexed signals for transmission on a centralized lightwave carrier signal in block 302. In block 303, a plurality of orthogonal frequency division multiplexed (OFDM) downstream data signals are multiplexed using wavelength-division multiplexing (WDM).

In block 304, the centralized lightwave carrier signal is received by a source-free optical network unit. The centralized lightwave carrier signal is split between a first path and a second path in block 306.

The centralized lightwave carrier signal is filtered on the first path to be received by a user, e.g., a consumer of services (such as Internet, video, telephone, etc.), in block 308. The filtering includes reducing fading effects, and may include optically interleaving the centralized lightwave carrier signal to convert a double sideband signal to a single sideband signal.

In block 310, the centralized lightwave carrier signal is remodulated on the second path with upstream data to produce an upstream data signal for transmission. This preferably includes intensity modulating the centralized lightwave carrier signal with the upstream data signal. The upstream signal may be information related to user selections, uploading or Internet browsing and hence may have a reduced bandwidth. In block 312, the upstream data signal is transmitted. The optical network unit may receive the centralized lightwave carrier as at least a 10 Gb/s intensity modulated orthogonal frequency division multiplexed signal and transmits upstream at least a 1.75 Gb/s on-off keying modulated signal.

Having described preferred embodiments of a system and method for a centralized lightwave WDM-PON employing intensity modulated downstream and upstream signals (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An optical system, comprising:
a source-free optical network unit coupled to an optical fiber for receiving a centralized lightwave carrier signal with downstream data over the optical fiber;
the optical network unit including:
a coupler configured to split the original carrier signal into a first path and a second path;
the first path including an optical filter configured to reduce fading effects of the carrier signal; and
the second path including a modulator configured to remodulate the centralized lightwave carrier signal with upstream data to produce an upstream data signal for upstream transmission;
wherein the optical filter includes an optical interleaver configured to convert a double sideband signal into a single sideband signal.

2. The system as recited in claim 1, wherein the centralized lightwave carrier includes a plurality of downstream signals multiplexed using wavelength-division multiplexing (WDM).

3. The system as recited in claim 1, wherein the modulator of the optical network unit includes an intensity modulator configured to remodulate the centralized lightwave carrier signal.

4. The system as recited in claim 1, wherein the optical network unit receives the centralized lightwave carrier as at least a 10 Gb/s intensity modulated orthogonal frequency division multiplexed signal and transmits upstream at least a 1.75 Gb/s on-off keying modulated signal.

5. An optical system, comprising:
an optical line terminal (OLT) configured to modulate a downstream data signal by wavelength division multiplexing on a plurality of orthogonal channels for transmission on a centralized lightwave carrier signal;
a source-free optical network unit coupled to the OLT by an optical fiber, the optical network unit having a modulator configured to remodulate the centralized lightwave carrier signal with upstream data to produce an upstream data signal for transmission back to the OLT, the optical network unit including:
a coupler configured to split the original carrier signal into a first path and a second path;
the first path including an optical filter configured to reduce fading effects of the carrier signal; and
the second path including a modulator configured to remodulate the centralized lightwave carrier signal with upstream data to produce an upstream data signal for upstream transmission;
wherein the optical filter includes an optical interleaver configured to convert a double sideband signal into a single sideband signal.

6. The system as recited in claim 5, wherein the OLT includes an intensity modulator configured to modulate the centralized lightwave carrier signal.

7. The system as recited in claim 5, wherein the coupler splits the centralized lightwave carrier signal in half between the first path and the second path.

8. The system as recited in claim 5, wherein the modulator of the optical network unit includes an intensity modulator configured to remodulate the centralized lightwave carrier signal.

9. The system as recited in claim 5, wherein the OLT includes a multiplexer to wavelength division multiplex a plurality of intensity modulated channels.

10. The system as recited in claim 5, wherein the optical network unit receives the centralized lightwave carrier as at least a 10 Gb/s intensity modulated orthogonal frequency division multiplexed signal and transmits upstream as at least a 1.75 Gb/s on-off keying modulated signal.

11. The system as recited in claim 5, further comprising a remote node for demultiplexing the downstream signal and multiplexing the upstream signal.

12. A method for providing a centralized lightwave source, comprising:

intensity modulating orthogonal frequency division multiplexed signals for transmission on a centralized lightwave carrier signal;

receiving the centralized lightwave carrier signal by a source-free optical network unit;

splitting the centralized lightwave carrier signal between a first path and a second path;

filtering the centralized lightwave carrier signal on the first path to be received by a user;

remodulating the centralized lightwave carrier signal on the second path with upstream data to produce an upstream data signal for transmission; and transmitting the upstream data signal;

wherein filtering the centralized lightwave carrier signal includes optically interleaving the centralized lightwave carrier signal to convert a double sideband signal to a single sideband signal.

13. The method as recited in claim 12, further comprising multiplexing a plurality of orthogonal frequency division multiplexed (OFDM) downstream data signals using wavelength-division multiplexing (WDM).

14. The method as recited in claim 12, wherein remodulating includes intensity modulating the centralized lightwave carrier signal with the upstream data signal.

15. The method as recited in claim 12, wherein filtering the centralized lightwave carrier signal includes reducing fading effects.

16. The method as recited in claim 12, wherein the optical network unit receives the centralized lightwave carrier as at least a 10 Gb/s intensity modulated orthogonal frequency division multiplexed signal and transmits upstream as at least a 1.75 Gb/s on-off keying modulated signal.

* * * * *